United States Patent [19]

De Luca

[11] Patent Number: 4,813,071
[45] Date of Patent: Mar. 14, 1989

[54] LAMINAR TYPE TELEPHONE CONNECTOR BLOCK

[75] Inventor: Paul V. De Luca, Plandome Manor, N.Y.

[73] Assignee: Porta Systems Corp., Syosset, N.Y.

[21] Appl. No.: 896,119

[22] Filed: Aug. 13, 1986

[51] Int. Cl.$^4$ .............................................. H04Q 1/14
[52] U.S. Cl. ...................................... 379/327; 361/426
[58] Field of Search ...................... 379/325, 326, 327; 361/426, 425

[56] References Cited

U.S. PATENT DOCUMENTS 3,660,613  5/1972  Mullin et al. ....................... 379/326

Primary Examiner—James L. Dwyer
Attorney, Agent, or Firm—Charles E. Temko

[57] ABSTRACT

An adjustably sized laminar type telephone connector block suitable for interconnecting telephone subscriber pairs to telephone office switching equipment. The block comprises a plurality of superposed contact holding elements positioned between a pair of support elements, the support elements in turn having means for attachment to a main frame. The capacity of an individual block is varied by adding or removing contact holding elements. Each contact holding element includes pairs of interconnected quick clip contact elements of generally planar configuration which are separated from corresponding quick clip elements of adjacent contact holding elements by laterallly directed insulative flanges which overlie the quick clip contact elements, and which form strain relief means for conductors engaged upon the contact elements.

4 Claims, 3 Drawing Sheets

LAMINAR TYPE TELEPHONE CONNECTOR BLOCK

BACKGROUND OF THE INVENTION

This invention relates generally to the field of telephony, and more particularly to an imporved subscriber circuit connector block normally employed for interconnecting subscriber pairs to telephone company switching equipment. Devices of this general type are well known in the art, and the invention lies in specific constructional details which permit manufacture by assembling plural laminar elements to vary the effective capacity of an individual block, as well as improved convenience of assembly, installation and interconnection.

Laminar type construction in the manufacture of telephone connector blocks has been employed in the prior art, some of such constructions employing so-called quick clip terminals, the use of which has become standardized in the telephone industry. The present practice is to insert mold the connectors in place with the free ends projecting from the block to permit interconnection of conductors using an installation tool. The insert molding technique, of necessity, cannot provide insulative protection extending to the free ends of the quick clip connector terminals, nor can it provide for ready replacement of a damaged contact should such replacement become necessary. Further, once manufactured, the particular type of connector is not subject to modification for individual requirements of a user at a later date.

SUMMARY OF THE INVENTION

Briefly stated, the invention contemplates the provision of an improved telephone connector block of the class described which is particularly suited for low cost of production, with a high degree of convenience in assembly using plural numbers of standardized components maintained in operative relation using threaded connecting members. An individual block comprises first and second end support elements and a number of individual planar contact holding elements each of which contains interconnected pairs of quick clip terminals, each interconnected pair accommodating a single subscriber circuit. The quick clip terminals are maintained in position solely by the juxtaposed condition of adjacent contact holder elements. The end support elements are threadedly engaged to maintain contact holder elements disposed therebetween. The contact holder elements support the quick clip contact elements throughout substantially the entire length of the later, and provide insulative and strain relief protective functions as well.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
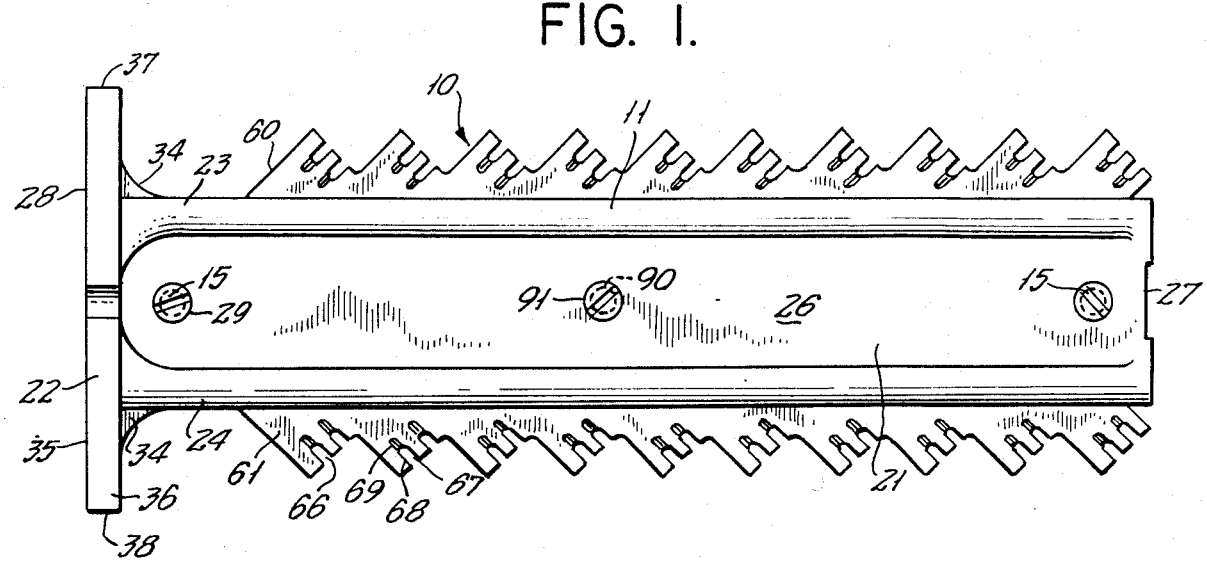
FIG. 1 is a top plan view of an embodiment of the invention.
Figure 3:
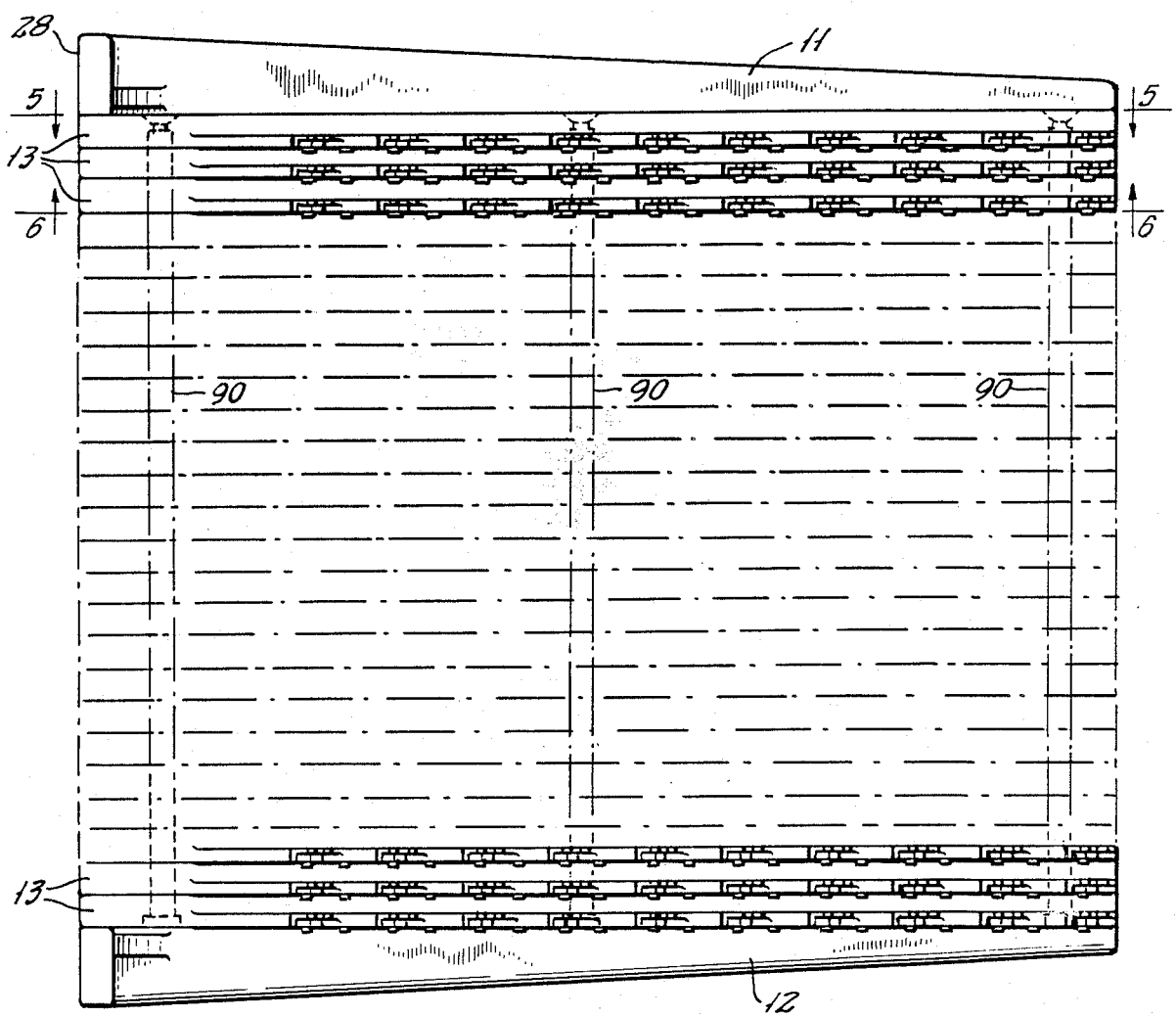
FIG. 3 is a side elevational view thereof.
Figure 2:
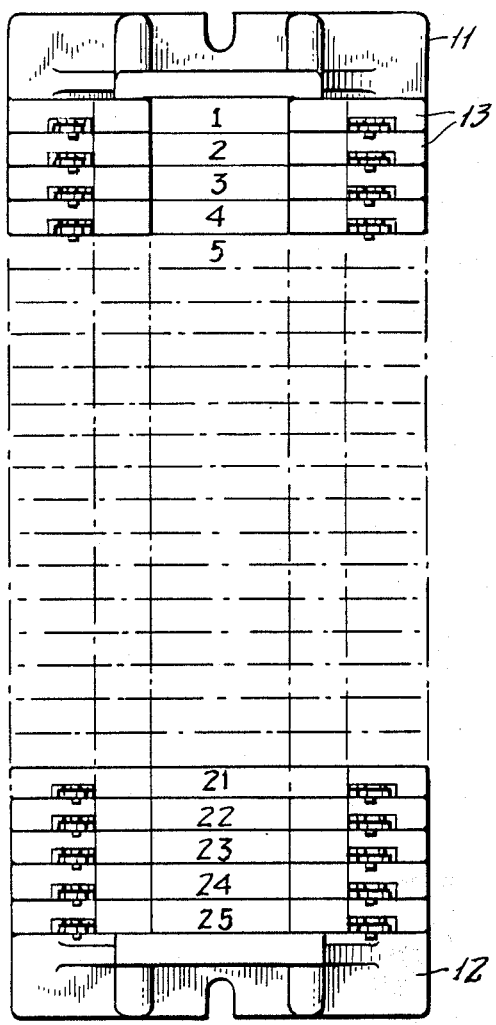
FIG. 2 is a front elevational view thereof.
Figure 4:
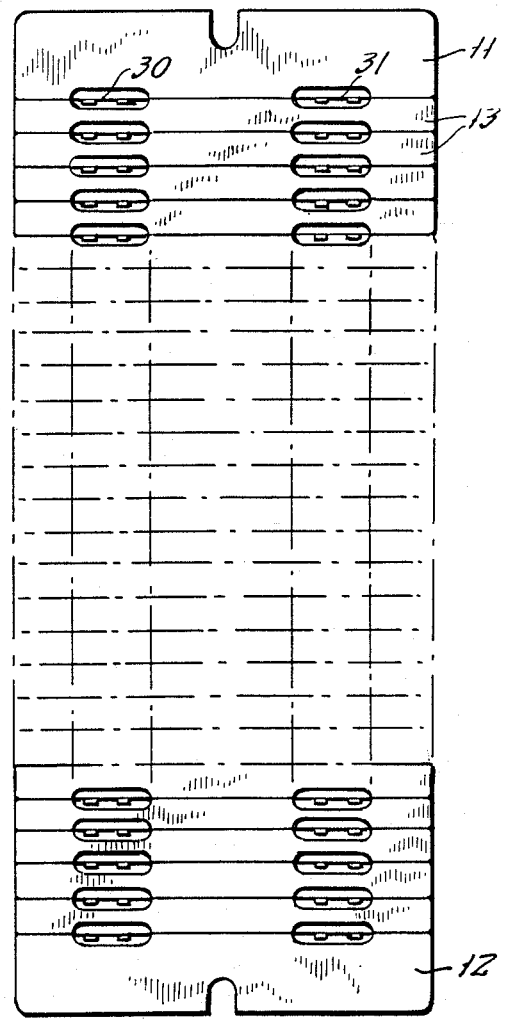
FIG. 4 is a rear elevational view thereof.

In accordance with the invention, the device, generally indicated by reference character 10, comprises broadly: first and second support elements 11 and 12, plural contact holding elements 13, corresponding quick clip connector elements 14, and interconnecting means 15.

The elements 11 and 12 are substantially identical, and accordingly, a detailed consideration of one of such elements will serve equally well to describe the other. Each element is formed from molded synthetic resinous materials, and includes an elongated main body 21, an inner end flange 22, and a pair of tapered longitudinally extending flanges 23 and 24.

The main body 21 is bounded by an outer surface 26 which extends to a notched outer end surface 27, as well as a parallel inner surface 28. A plurality of bores 29 extend between the inner and outer surfaces. Recesses 30 and 31 form portions of wire guide means, while recesses 32 and 33 provide clearance for the elements 14, as will more fully appear. The end flange 22 includes fillets 34, and is bounded by an inner surface 35, an outer surface 36, as well as end surfaces 37 and 38.

The contact holding elements 13 are also preferably integrally molded from synthetic resinous materials, and include a main body 44 having an inner end 45 from which a pair of laterally extending flanges 46 and 47 project. An outer end 48 terminates in a notched recess 49 for the accommodation of indicia means 49' of known type. Through openings 50 correspond to similar openings 29 in the elements 11 and 12 to accommodate the means 15.

An upper surface 52 is provided with axially extending shaped recesses 53 for clearance purposes. These recesses are disposed inwardly of first and second longitudinal edges 54 and 55. A corresponding lower surface 59 communicates with a pair of laterally extending flanges 60 and 61, each of which includes angularly disposed rectangular recesses 62 which communicate at a channel 63 at the inner end thereof with a centrally disposed recess 64. Each of the recesses 62 includes an open outer end 66 having a pair of axially aligned slots 67, each slot including an outer relatively wider portion 68 and an inner relatively narrower portion 69. Each pair of interconnected recesses 62 accommodates a metallic contact element 70 having first and second contact members 71 and 72 in the form of quick clip connectors. Each pair of contact members is welded or soldered together at point 73.

The contact members 71-72 include a main body 75 forming first and second outer tines 76 and 77, as well as a central tine 78 to form first and second conductor retaining slots 79 and 80. As is known in the art, the slots include a wider portion 81 which serves an insulation displacing function, and an inner portion 82 which resiliently retains a bared conductor. The inwardly projecting wire wrap legs 85 are soldered or welded at the point 73, above mentioned, to provide communication from one side of the block to the other.

The above-described elements are maintained in integrated condition by the means 15 which includes a plurality of threaded shanks 90 and corresponding headed screws 91 engaged at each end thereof. When installed, conductors (not shown) are threaded through wire guide passages formed by the flanges 60 and 61 to be engaged upon the free ends of the quick clip connectors in known manner using an installation tool. Such installation will normally displace insulation surrounding a conductor, so that the bare conductor will be in communication between the tines of the quick clip connector. In the case of the present construction, the portions 69 of the slot 67 will then engage adjacent, non-displaced, portions of the insulative covering and form a strain relief for the related conductor.

Figure 10:
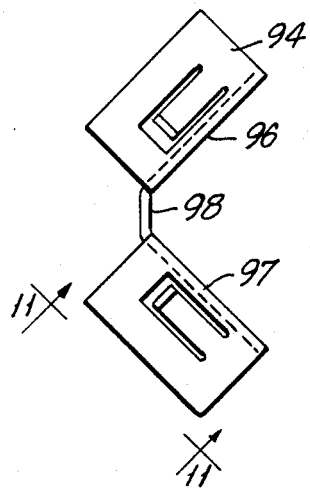
FIG. 10 is an enlarged view in elevation of the alternate form of contact element.
Figures 11, 12:
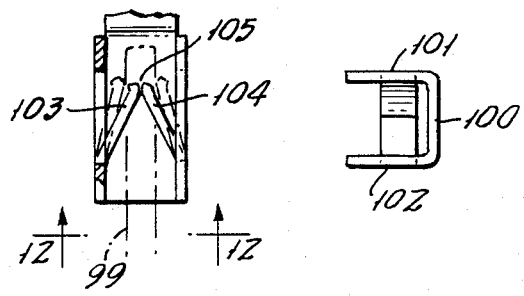
FIG. 11 is a fragmentary view in elevation, partly in section, corresponding to the upper portion of FIG. 10, and showing the engagement of a resiliently engaged quick clip terminal.
FIG. 12 is an end elevational view as seen from the plane 12—12 in FIG. 11.
Figure 5:
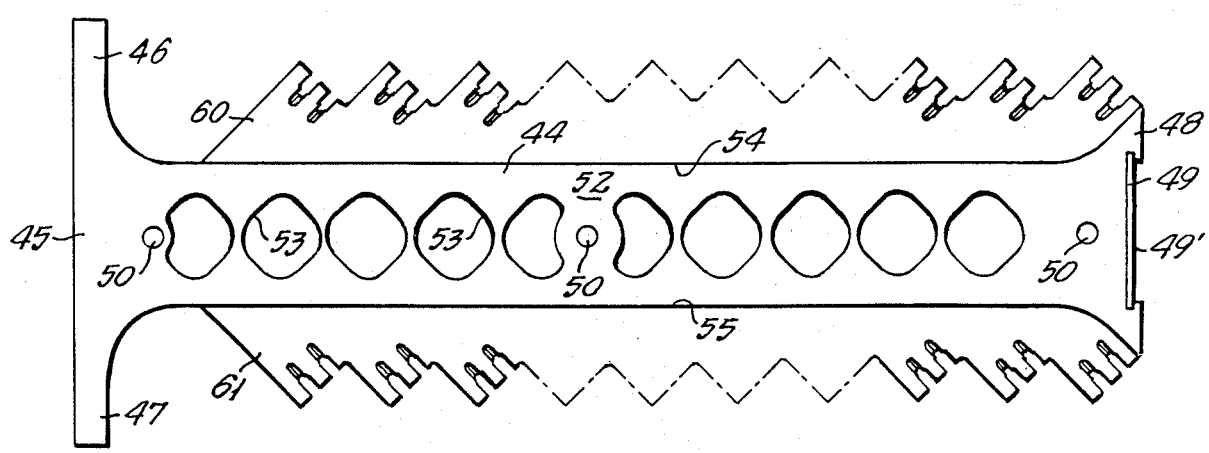
FIG. 5 is a horizontal sectional view thereof as seen from the plane 5—5 in FIG. 3.
Figure 6:
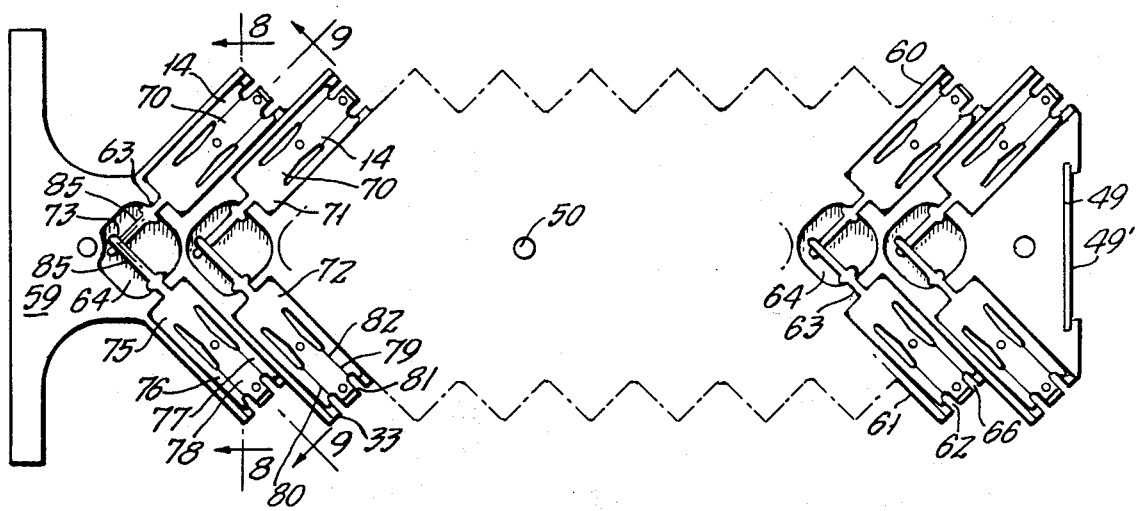
FIG. 6 is a horizontal sectional view thereof as seen from the plane 6—6 in FIG. 3.
Figure 7:
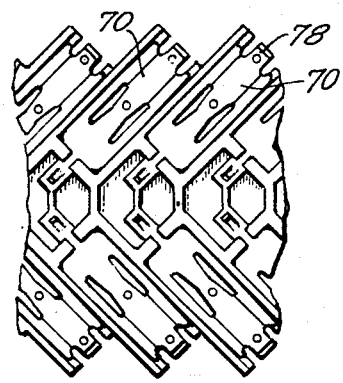
FIG. 7 is a fragmentary view in elevation of an alternate form of contact element.
Figures 8, 9:
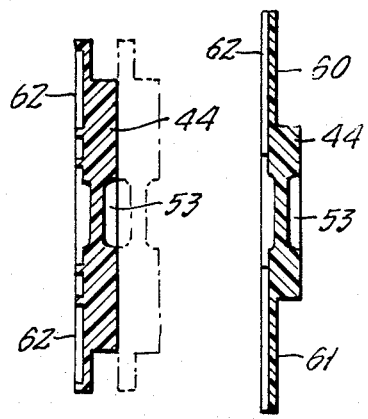
FIG. 8 is a transverse sectional view as seen from the plane 8—8 in FIG. 6.
FIG. 9 is a transverse sectional view as seen from the plane 9—9 in FIG. 6.

Turning now to FIGS. 10, 11, and 12 in the drawing, there is illustrated an alternate form of contact element suitable for use where the user desires the convenience of a quick clip connector which may be manually removed after the device has been assembled, for purposes of replacement without the necessity of disassembling the device. Such replacement might be desirable in the case of damage, or where a different gauge of conductor is interconnected to certain of the quick clip terminals.

In lieu of employing standardized quick clip connectors, there is provided a contact element 94 which may be formed as a metallic stamping from phosphor bronze or similar material. The unitary stamping includes first and second channel forming members 96 and 97 interconnected by a common wall 98. Quick clip terminals 99 are formed separately, without a wire wrap stem.

The channel forming members 96 and 97 each include a base wall 100 and a pair of side walls 101 and 102 from which resilient tongues 103 and 104 are bent inwardly into the channel formed between the walls 101 and 102. The tongues, in relatively unstressed condition, abut each other at the free ends 105, and are moved away from each other with the insertion of the quick clip members 99.

I wish it to be understood that I do not consider the invention limited to the precise details of structure shown and set forth in this specification, for obvious modifications will occur to those skilled in the art to which the invention pertains.

I claim:

1. An improved telephone connector block for interconnecting individual subscriber pairs to central office equipment comprising: first and second elongated support elements, a plurality of generally planar contact holding elements positioned between said support elements in parallel juxtaposed relation, a plurality of contact elements supported upon each of said contact holding elements, and means interconnecting said support elements and contact holding elements in substantially congruent relation; said support elements having means for interconnecting said block to a telephone main frame; said contact holding elements having a principal axis and having first and second planar surfaces, one of said surfaces having a plurality of paired laterally extending recesses communicating with each other at inner ends thereof; said contact elements each including paired and interconnected quick clip terminals positioned within a corresponding pair of recesses; said contact holding elements, in juxtaposed relation, forming passages for accommodating conductors on either side thereof communicating with one of each of said pairs of laterally extending recesses, whereby outside subscriber pairs may be interconnected on one side of said block, and corresponding inside pairs may be interconnected on an opposite side of said block.

2. An improved telephone connector block in accordance with claim 1, further characterized in said pairs of quick clip connectors being oriented at a mutual right angle.

3. An improved telephone connector block in accordance with claim 1, further characterized in said quick clip connectors being separably interconnected and maintained in mutual interconnection by an interconnecting member having resilient means retaining said quick clip connectors.

4. An improved telephone connector block in accordance with claim 1, further characterized in said recesses in said contact holding elements substantially enclosing the entire length of said quick clip elements, and having openings therein corresponding to conductor retaining slots in said quick clip connectors wherein to provide a strain relief function relative to an engaged conductor.

* * * * *